United States Patent
Hirabayashi (10) Patent No.: US 7,853,039 B2
(45) Date of Patent: Dec. 14, 2010

(54) WORKFLOW MANAGEMENT SYSTEM AND WORKFLOW MANAGEMENT METHOD

(75) Inventor: Kazunori Hirabayashi, Shizuoka-ken (JP)

(73) Assignees: Kabushiki Kaisha Toshiba, Tokyo (JP); Toshiba Tec Kabushiki Kaisha, Tokyo (JP)

(\*) Notice: Subject to any disclaimer, the term of this patent is extended or adjusted under 35 U.S.C. 154(b) by 974 days.

(21) Appl. No.: 11/668,181

(22) Filed: Jan. 29, 2007

(65) Prior Publication Data
US 2008/0183536 A1  Jul. 31, 2008

(51) Int. Cl.
*G06K 9/00* (2006.01)
(52) U.S. Cl. ............................. 382/100; 382/292
(58) Field of Classification Search ............ 382/176, 382/173, 175, 293, 100, 292; 705/8; 704/270, 704/278; 715/765; 707/999.01; 1/1
See application file for complete search history.

(56) References Cited

U.S. PATENT DOCUMENTS 7,668,372 B2 \* 2/2010 Schiehlen ................. 382/176
7,668,718 B2 \* 2/2010 Kahn et al. ................. 704/270

FOREIGN PATENT DOCUMENTS

| JP | 2002-230202 | 8/2002 |
| JP | 2004-109172 | 4/2004 |
| JP | 2004-151833 | 5/2004 |

\* cited by examiner

*Primary Examiner*—Anh Hong Do
(74) *Attorney, Agent, or Firm*—Turocy & Watson, LLP (57) ABSTRACT

In a workflow management system for managing a workflow processing in which a processing object is document data read and digitized by an image reading apparatus, a technique to improve processing efficiency in the workflow processing is provided.

The workflow management system includes a document data acquisition unit to acquire, as the processing object in the workflow processing, the document data made to correspond to reliability information as information indicating reliability of an image reading processing in the image reading apparatus, a reliability information acquisition unit to acquire the reliability information made to correspond to the document data acquired by the document data acquisition unit, and a processing execution unit to execute, based on the reliability information acquired by the reliability information acquisition unit, a specified processing relating to an approval processing in the workflow concerning the document data acquired by the document data acquisition unit.

20 Claims, 11 Drawing Sheets

RELATED ART

FIG.6

INVENTION

FIG.7

DEBIT NOTE

| APPLICANT | DEBIT NOTE | 100 |
| AFFILIATION | OX DEPARTMENT, THIRD SECTION, IN CHARGE OF A | 100 |
| ADDRESS | OO CO., LTD. | 100 |
| PROVISO | BOOK | 100 |
| SUM | ¥3000 | 100 |
| DATE | FEBRUARY 20, 2006 | 90 |

R

APPROVAL

ELECTRONIC DATA DISPLAY

WORKFLOW MANAGEMENT SYSTEM AND WORKFLOW MANAGEMENT METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to a workflow management system for managing a workflow processing in which a processing object is document data read and digitized by an image reading apparatus, and particularly to a technique to improve processing efficiency in a workflow processing.

2. Description of the Related Art

Hitherto, in a workflow system in which a paper document is made an input, there is known a system which electronically processes a document used in a business processing, such as a receipt, a purchase order, a statement of delivery, or an estimate sheet. In a general structure of the workflow system as stated above, a paper document is read by an image reading apparatus, and an image area of document data is read by using specified layout information. An OCR processing is performed on the image area as the object, and character information is obtained. The information acquired as stated above is made to correlate with the content of each form and is stored in a database, and a workflow processing is performed using the electronic information.

Besides, as methods of ensuring the reliability of the electronic data as the object of the processing in the foregoing workflow system, various methods are proposed, and general methods include a method in which digitized data is made to have a hash value and the data is identified, a method in which an electronic signature is attached and the correctness of the document is proved, and a method in which a proof is provided by a time stamp (see JP-A-2002-230202, JP-A-2004-109127, JP-A-2004-151833).

Until now, although various business documents are required to store paper documents as originals, since the e-document law was enforced, digitized data, not the paper document, is accepted as the original.

Although the document data as the object of a processing in the workflow is required to have reliability in view of the influence on a later-stage processing in the workflow processing and the work efficiency, in the related art, only the correctness of the data is ensured, and it is not ensured whether the document used in the business flow can be truly handled in the business flow (for example, whether it is read in a sufficiently identifiable state at the time of scan processing). Thus, in the workflow processing of the related art, an approving person who performs an approval processing must perform a work while paying attention to such a point that the document data as the object of the process was accurately scanned, and there has been a problem in the work efficiency of the workflow processing and the reliability of the processing.

The invention has been made to solve the foregoing problem, and it is an object to provide, in a workflow management system for managing a workflow processing in which a processing object is document data read and digitized by an image reading apparatus, a technique of improving processing efficiency in the workflow processing.

DETAILED DESCRIPTION OF THE INVENTION

Hereinafter, embodiments of the invention will be described with reference to the drawings.

Throughout this description, the embodiments and examples shown should be considered as exemplars, rather than limitations on the apparatus, methods and programs of the present invention.

First Embodiment

First, a first embodiment of the invention will be described.

Figure 1:
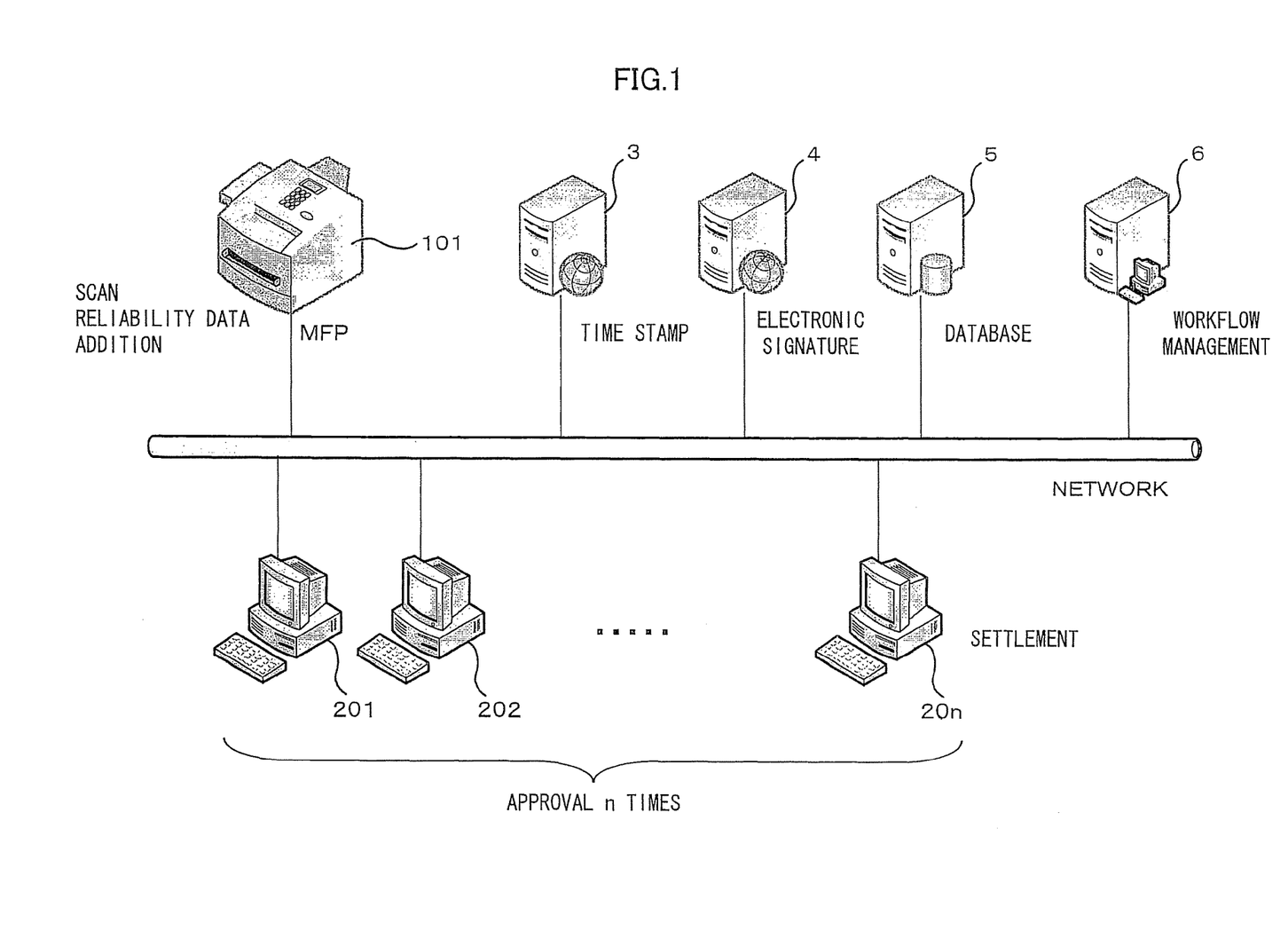
FIG. 1 is a network structural view for explaining a system structure of a workflow management system according to the embodiment.

FIG. 1 is a network structural view for explaining a system structure of a workflow management system according to the embodiment.

As shown in the drawing, the workflow management system according to the embodiment includes an image reading apparatus (MFP) 101, a PC 201 to a PC 20n, and servers 3 to 6, and these network structural equipments are connected to be capable of communicating with each other through an electric communication line such as a LAN.

The image reading apparatus (MFP) 101 has a function to optically read an original document, to digitize it and to create document data.

The server 6 has a function as a management server to manage the flow of processing of a workflow for performing business management using the workflow processing.

The PC 201 to PC 20n are PCs operated by respective approving persons who perform approval works in the workflow processing based on the workflow managed by the server 6 (or PCs logged in with accounts given rights of approval). Each of the approving persons performs the approval work based on the content of a screen display on the display of the PC. Here, a case where n approvals are required up to the settlement of a workflow processing (a case where approval works by n approving persons are performed) is shown as an example.

The server 3 is a time stamp management server to perform time management, and transmits information (time stamp) relating to the time at the time point according to a request from an external equipment.

The server 4 is a management server to manage an electronic signature, and transmits the electronic signature (time stamp) to prove a person who has performed a specific processing or a creator of data according to a request from an external equipment.

The server 5 has a function as a management server to manage a database of storing various data.

Figure 2:
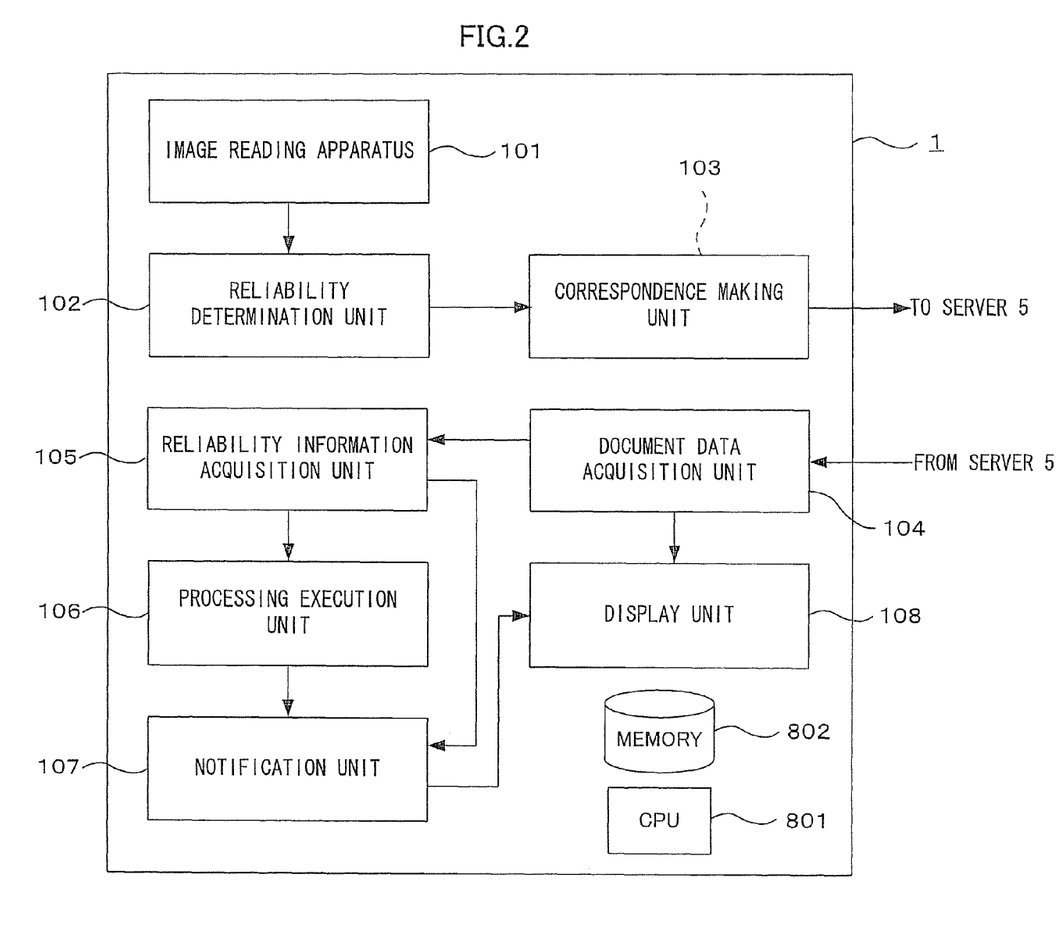
FIG. 2 is a functional block diagram for explaining the workflow management system according to the embodiment.

FIG. 2 is a functional block diagram for explaining a workflow management system according to the embodiment. The respective functions provided in the workflow management system shown in FIG. 2 are resultantly realized by cooperation of the image reading apparatus 101, the PC 201 to the PC 20n and the servers 3 to 6 shown in FIG. 1. Thus, the respective components shown in FIG. 2 may be arranged in any equipment, and all components of the workflow management system 1 have only to be gathered resultantly.

The workflow management system 1 of the embodiment includes an image reading apparatus 101, a reliability determination unit 102, a correspondence making unit 103, a document data acquisition unit 104, a reliability information acquisition unit 105, a processing execution unit 106, a notification unit 107, a display unit 108, a CPU 801, and a MEMORY 802.

The workflow management system 1 of the embodiment has a role to manage a workflow processing in which a processing object is document data read and digitized by the image reading apparatus 101. Hereinafter, the respective elements constituting the workflow management system 1 will be described in detail.

The image reading apparatus 101 reads the document data and digitizes it. The image reading apparatus 101 here is, for example, an MFP (Multi Function Peripheral).

The reliability determination unit 102 has a function to determine, based on document data read by the image reading apparatus 101, the reliability of an image reading processing in the image reading apparatus 101 concerning the document data.

Specifically, the reliability determination unit 102 has a function to perform a layout analysis of the document data read by the image reading apparatus 101, and to determine the reliability of the image reading processing in the image reading apparatus 101 for each object based on the object extracted by the layout analysis and a specified object.

Besides, the reliability determination unit 102 performs the layout analysis of the document data read by the image reading apparatus 101, and determines the reliability of the image reading processing in the image reading apparatus 101 based on the coincidence ratio between a character string of the object extracted by the layout analysis and a specified character string corresponding to the object. Here, the determination of the coincidence ratio of the character strings is performed for only a portion of "AAA" in the character string of "AAA Co., Ltd.", so that it is possible to perform a coincidence ratio evaluation in which importance is given to a character portion with a high possibility that it is changed for each document.

Of course, the determination of the reliability by the reliability determination unit 102 may be performed not only for each object included in the document data, but also for the whole document data totally.

The correspondence making unit 103 makes the document data read by the image reading apparatus 101 correspond to the reliability of the document data determined by the reliability determination unit 102 and stores them in, for example, the database 5 (specified storage area). Specifically, the correspondence making unit 103 adds, as metadata, the reliability of the document data determined by the reliability determination unit 102 to the document data read by the image reading apparatus 101.

Incidentally, here, the information indicating the reliability is, for example, metadata indicating the evaluation value of the reliability, and making the correspondence between the document data and the information indicating the reliability means embedding the information indicating the reliability into the document data. Besides, embedding the information indicating the reliability into the document data means that the metadata is added as metadata to the document data as the object.

Incidentally, making the correspondence between each object in the document data and the information indicating the reliability of the image reading processing is not necessarily required to be performed by the embedding processing of the information indicating the reliability into the document data, and for example, the information indicating the reliability of the image reading processing made to correspond to each object in the document data may be stored in the storage area such as the server 5 (database) separately from the document data (that is, the correspondence relation between the object in the document data and the reliability has only to be confirmed).

The document data acquisition unit 104 acquires the document data made to correspond to the reliability information, which is the information indicating the reliability of the image reading processing in the image reading apparatus 101, by the correspondence making unit 103 from, for example, the database 5.

The reliability information acquisition unit 105 acquires the reliability information made to correspond to the document data, which is acquired by the document data acquisition unit 104, by the correspondence making unit 103 from the document data or the database 5.

The processing execution unit 106 causes a specified processing relating to the approval processing in the workflow concerning the document data acquired by the document data acquisition unit 104 to be executed based on the reliability information acquired by the reliability information acquisition unit 105.

The notification unit 107 notifies the reliability information made to correspond to the document data to an approving person who performs an approval processing in the workflow with respect to the document data acquired by the document data acquisition unit 104. Incidentally, the notification by the notification unit 107 can be performed by, for example, a screen display on the display unit 108.

The display unit 108 includes, for example, a liquid crystal display, and has a role to screen-display the information relating to the processing content in the workflow management system 1.

The CPU 801 has a role to perform various processings in the workflow management system, and has a role to realize various functions by executing a program stored in the MEMORY 802. The MEMORY 802 includes, for example, a ROM and a RAM, and has a role to store various information and programs used in the workflow management system.

In this embodiment, as an example, it is assumed that a workflow system performs various business applications such as receipt settlement, ordering, and delivery. Hereinafter, an example in which the workflow of "receipt" is handled will be described.

First, an applicant scans a receipt by the image reading apparatus 101, and converts (digitizes) the receipt into electronic data. In the image reading apparatus 101, user authentication is performed at the time of scanning, and the user information of the applicant is acquired from, for example, the server 5. The user information here is information such as, for example, "name", "affiliation" and "approving person to the application user in the business flow". At the same time as the acquisition of the user information, information such as "date of scanning" and "setting of the image reading apparatus 101 at the time of scanning" is acquired from the server 5, and these acquired data are made metadata and are directly embedded in the digitized document data. Of course, the data acquired as described above is not embedded in the digitized document data, but may be stored in the instructions of the workflow stored in the server 6 in a state where it is made to correspond to the document data.

The document data digitized by the image reading apparatus 101 includes electronic data of a format capable of storing metadata, such as, for example, PDF (Portable Document Format) or XPS (XML Paper Specification).

Figure 3:
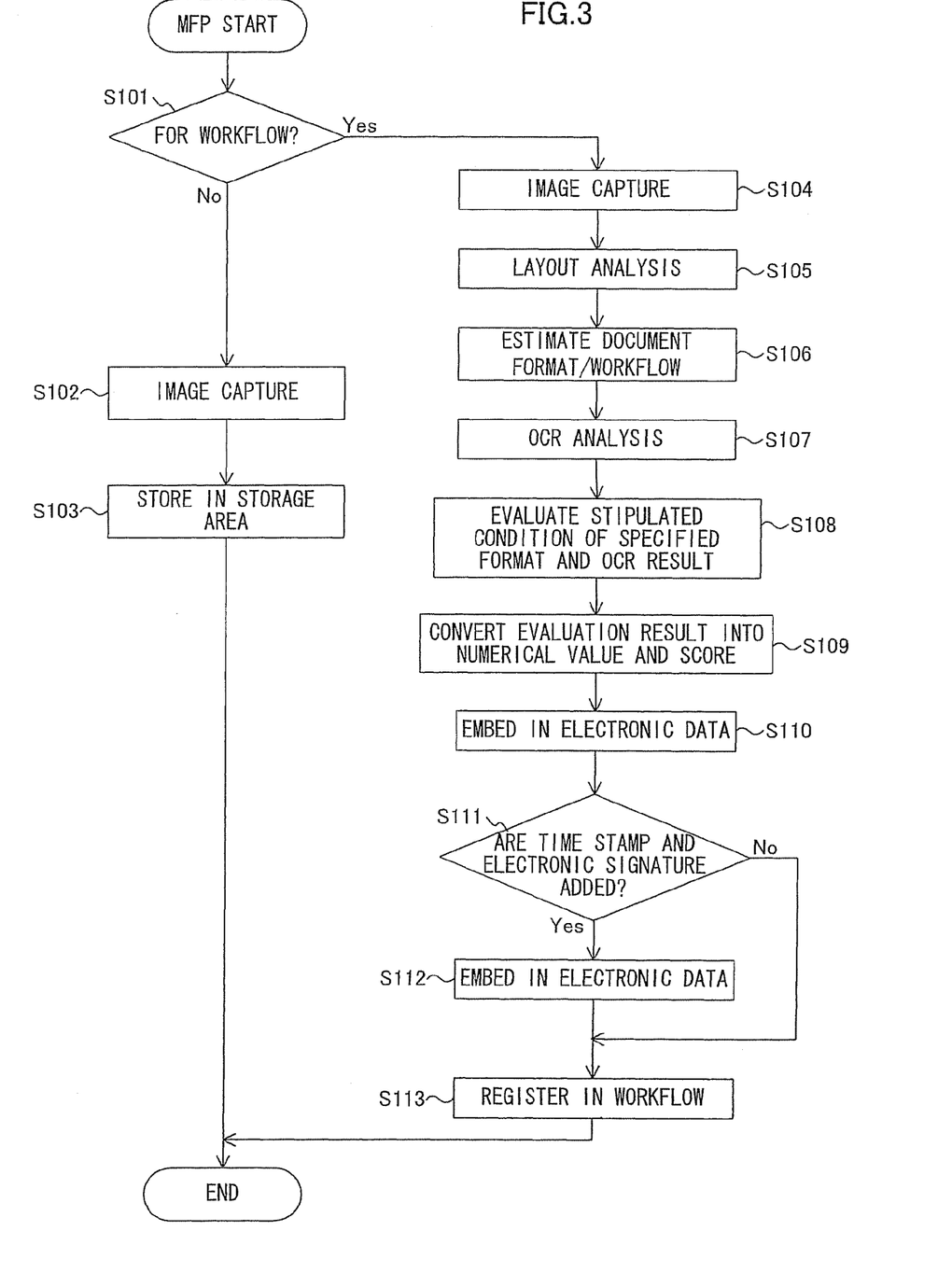
FIG. 3 is a flowchart for explaining a flow of a processing in a workflow management system according to a first embodiment of the invention.

FIG. 3 is a flowchart for explaining a flow of a processing in the workflow management system according to the first embodiment of the invention.

At the time of image reading in the image reading apparatus 101, in the case where a document as an object of the image reading processing is used in the workflow processing (S101, Yes), the image reading is started (S104).

Next, the reliability determination unit 102 performs a layout analysis (S105) for the document data read and digitized by the image reading apparatus 101, and it is estimated whether the data is in a specified format (format including an item such as, for example, "receipt", "address" or "sum") (S106).

In the case where it is estimated that the document data is in the specified format, the reliability determination unit 102 performs an OCR processing (S107). Next, the reliability determination unit 102 compares an element (object) constituting the layout in the document data with previously prepared information made to correspond to the format, and determines to what degree the content of the item of "receipt", "address" or "sum" is correct (has reliability) (S108).

The correspondence making unit 103 performs processing of adding, as metadata, data in which the determination result of the reliability of the document data obtained by the processing is converted into a score (S109) to the document data (or stores it in the instructions of the workflow) (S110). Here, the conversion of the determination result of the reliability into the score is performed such that, for example, in the document data of the receipt, in the case where data inputted to an item, which should be "OO Co., Ltd." in the business, is "OX Co., Ltd.", the score is made "30 points (in the case where the maximum score is 100)".

Thereafter, in the case where a time stamp and an electronic signature are added to the document data (S111, Yes), the correspondence making unit 103 adds the time stamp and the electronic signature to the document data (S112). The correspondence making unit 103 registers the document data made to correspond to various information as described above into the server 5, so that registration to the job of the workflow is performed (S113).

Figure 4:
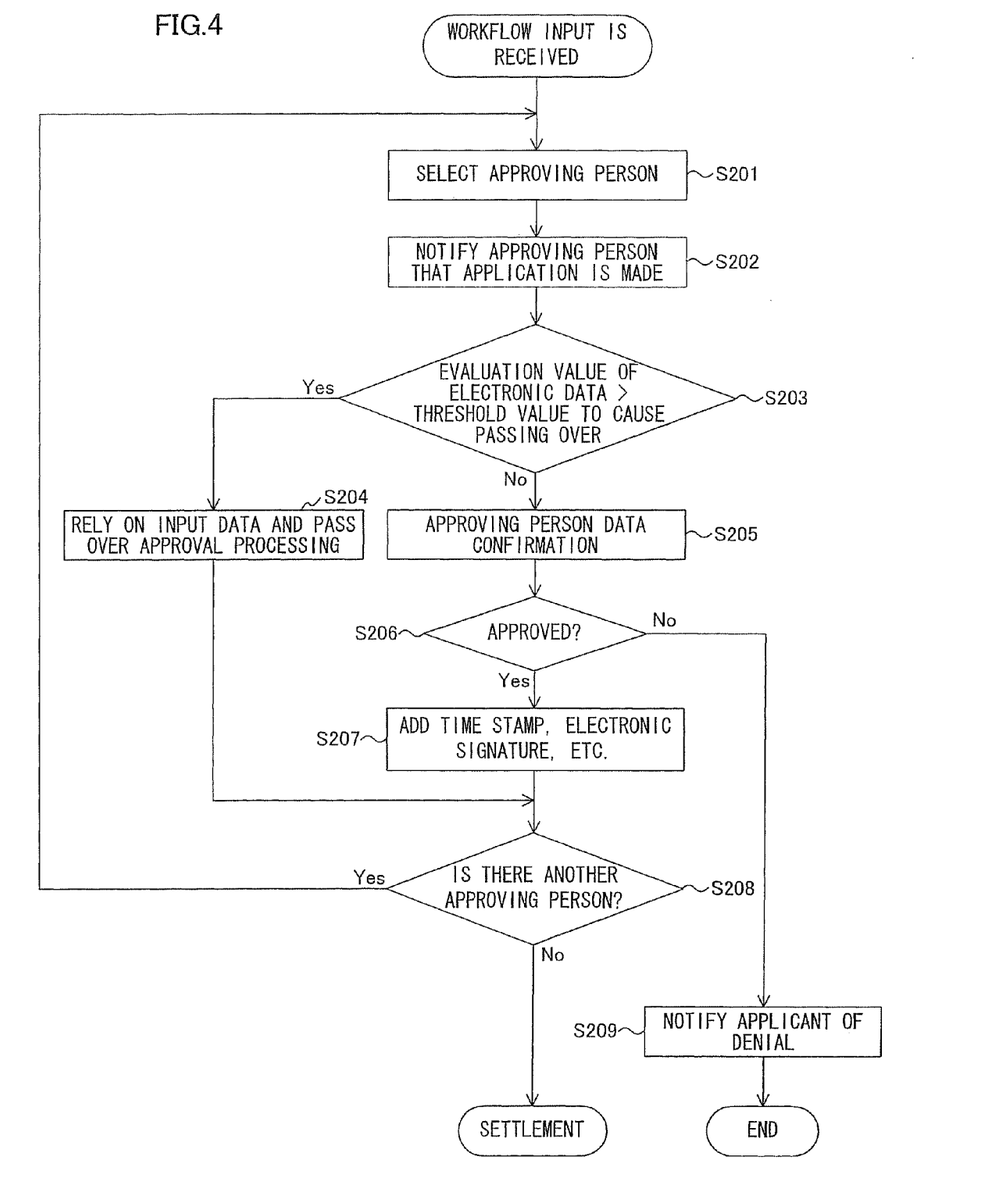
FIG. 4 is a flowchart for explaining a flow of a processing in the workflow management system according to the embodiment.
Figure 5:
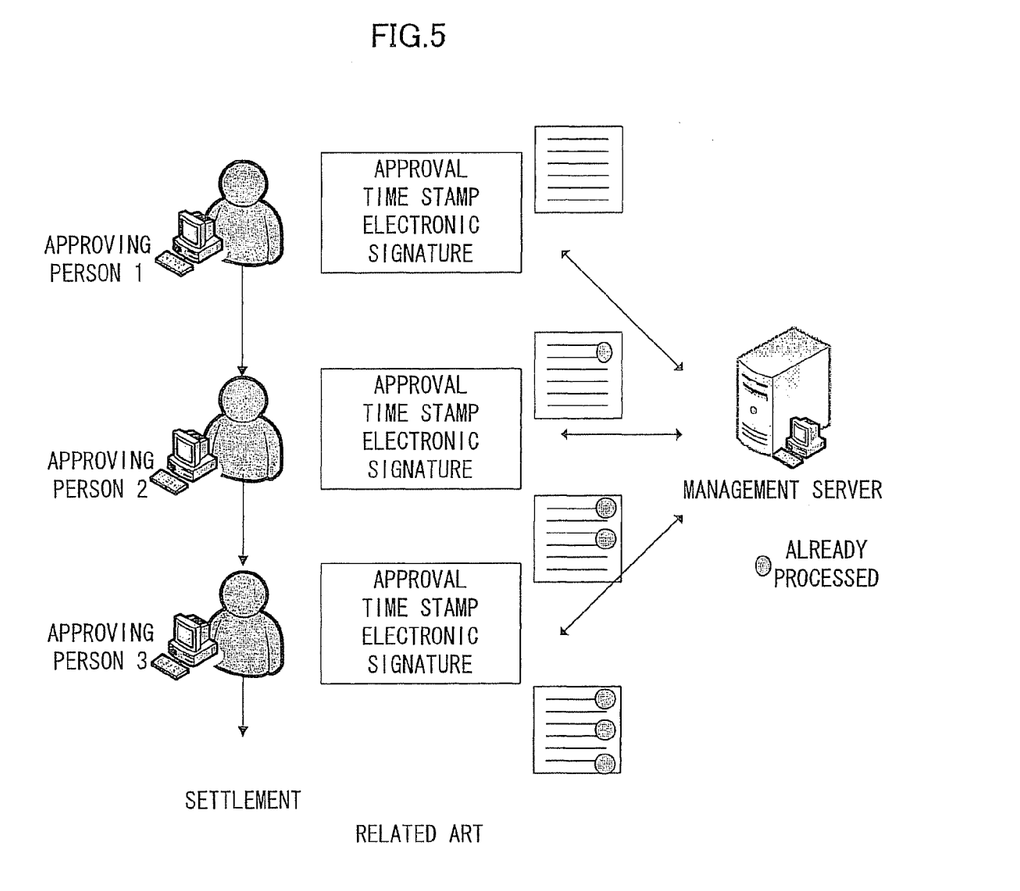
FIG. 5 is a conceptual view showing a flow of a workflow processing of the related art.
Figure 6:
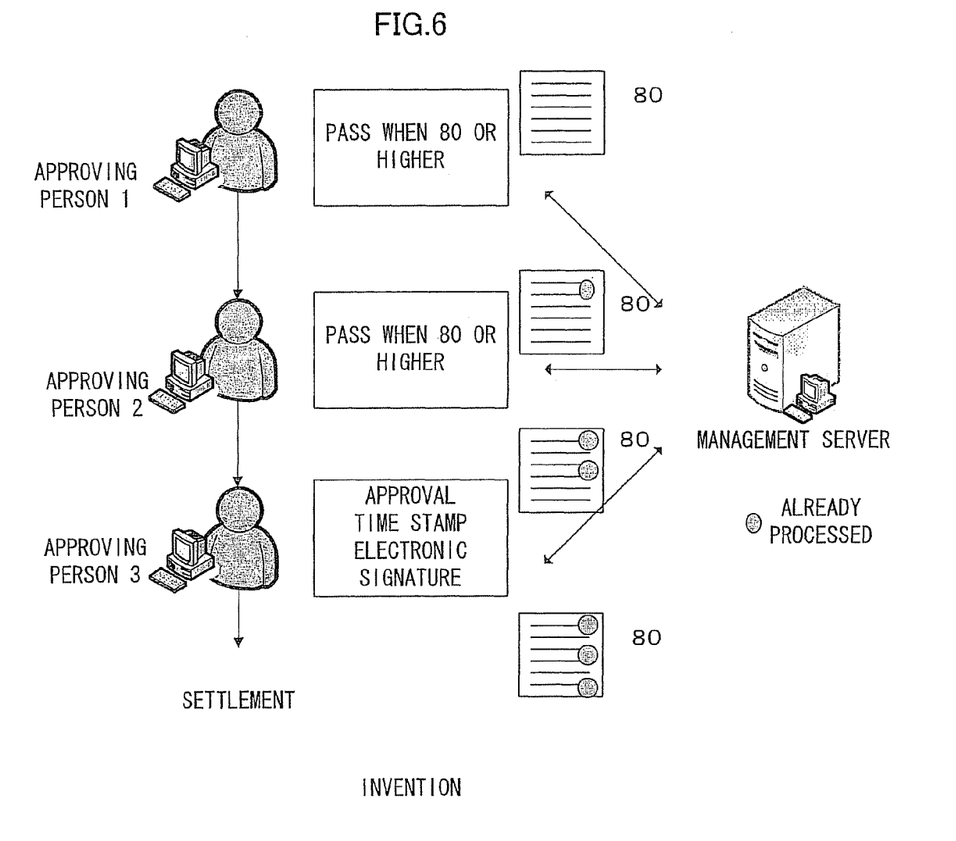
FIG. 6 is a conceptual view showing a flow of a workflow processing in the embodiment.

Next, the flow of the workflow processing using the document data registered as stated above will be described. FIG. 4 is a flowchart for explaining the flow of the processing in the workflow management system according to this embodiment, FIG. 5 is a conceptual view showing a flow of a workflow processing of the related art, and FIG. 6 is a conceptual view showing the flow of the workflow processing in this embodiment.

When the document data is registered in the job of the workflow processing, the workflow job selects an approving person (one or more approving persons) in accordance with the instruction of the workflow (S201).

The notification unit 107 notifies the approving person that an application for the workflow processing has been made (S202).

Next, the reliability information acquisition unit 105 acquires the information (evaluation score) indicating the reliability of the image reading processing made to correspond to the applied document data, and the processing execution unit 106 compares the evaluation score with a threshold value made to correspond to the selected approving person (S203). The threshold value made to correspond to the approving person may be set to a different value according to the rights of the approving person (importance of the approval processing performed in the workflow processing).

Here, in the case where the processing execution unit 106 determines that the evaluation score is higher than the threshold value (S203, Yes), the document data is regarded as being data having high reliability, the approval processing by the approving person is omitted (S204), and the processing proceeds to a later stage approval processing (S208).

Figure 7:
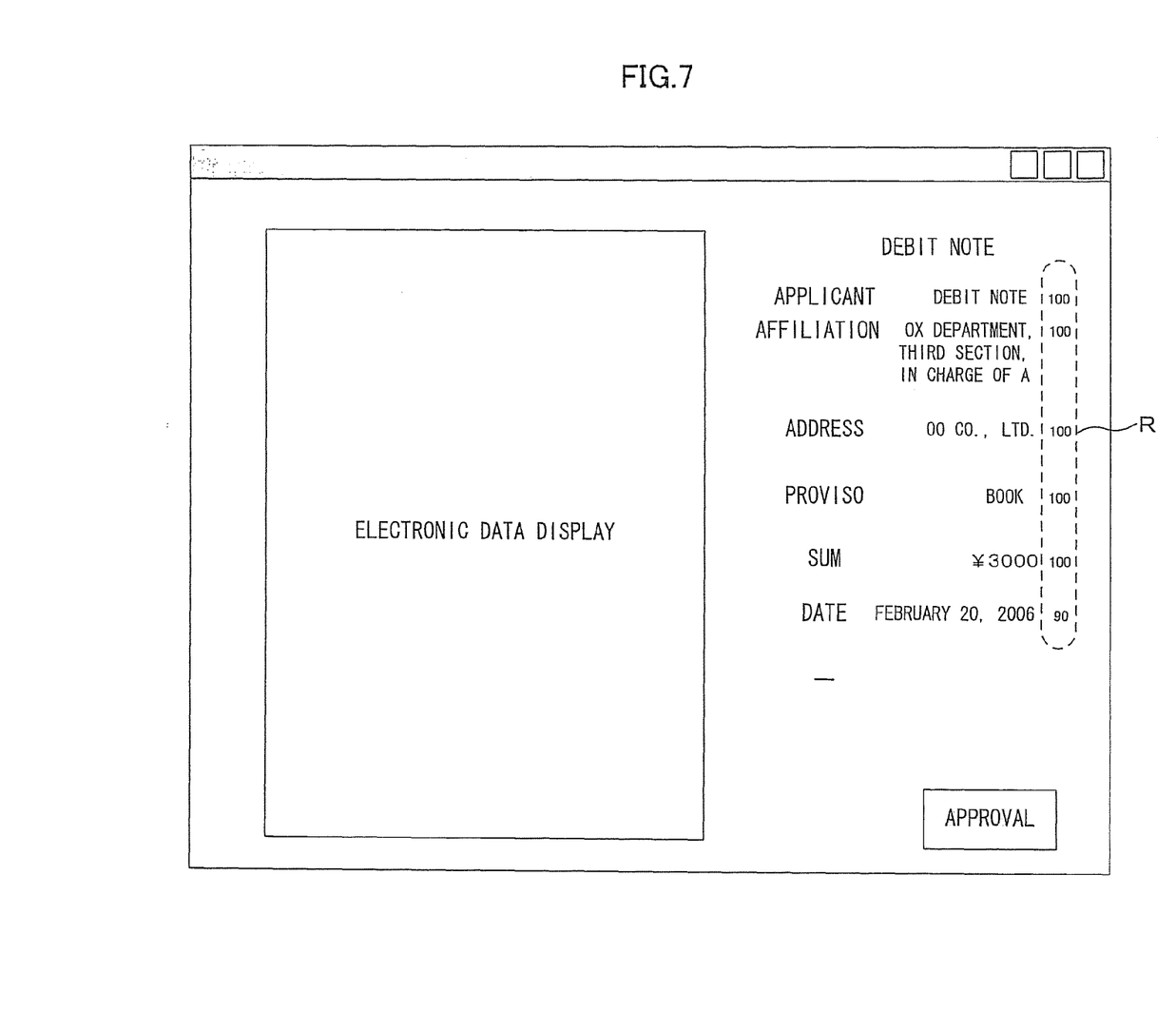
FIG. 7 is a view showing an example of content of a screen display on a display unit 108 at the time of approval work by an approving person.

On the other hand, in the case where it is determined that the evaluation score is lower than the threshold value (S203, No), the document data is regarded as being data having low reliability (requiring the check by the approving person), and the processing execution unit 106 causes the approving person to perform the approval processing by a browser or a dedicated terminal (S205). FIG. 7 is a view showing an example of the content of a screen display on the display unit 108 at the time of the approval work by the approving person. As shown in the drawing, the notification unit 107 notifies the reliability information made to correspond to the document data to the approving person who performs the approval processing. In the example shown in the drawing, an evaluation score R indicating the reliability determined for each of components is made to correspond to each of the components constituting the layout of the document data and is displayed (here, arranged at the right side and displayed).

With respect to a component whose evaluation score is the specified threshold value or lower, the notification unit 107 may cause an emphasis display to be performed by color, brightness, font, thickness of a character, shape or the like to particularly attract attention of the approving person. Of course, the degree of the emphasis by the notification unit 107 may be made high as the evaluation score becomes low with respect to the specified threshold value.

As a result of the approval work by the approving person, in the approved case (S206, Yes), the time stamp and electronic signature to prove the correctness of the approval processing to the document data are added to the document data as the approval object, and in the case where there is a later stage approval processing, the processing proceeds (S208).

On the other hand, as a result of the approval work by the approving person, in the unapproved case (S206, No), the notification unit 107 notifies the applicant of the workflow processing that it was not approved (S209).

As stated above, the processing execution unit 106 omits the approval processing by the approving person made to correspond to the threshold value lower than the reliability obtained by the reliability information acquisition unit 105. In other words, the approval processing in the workflow is executed by only the approving person made to correspond to the threshold value higher than the reliability acquired by the reliability information acquisition unit.

Here, it is preferable that the threshold value made to correspond to the approving person is set to a higher value when the approving person performs the approval processing at a more downstream side in the workflow. In general, the approval processing in the workflow increases the importance toward the downstream side (as the approval processing advances). Thus, with respect to the document data having high reliability in the image reading processing, the approval processing at the upstream side of the workflow processing is omitted, so that the steps required for the approval processing at the upstream side of the workflow processing can be reduced, which can contribute to the improvement of the work efficiency.

As stated above, in this embodiment, reference is made to the score item of each item of the metadata added to the electronic data, and when the data has a certain score or higher, the data is trusted, and it is determined that the processing is passed up to an approving person of what level. The notification unit 107 uses the communication function such as mail and notifies the approving person whose approval processing is omitted (passed over) by the processing execution unit 106 that the approval processing by the approving person was omitted.

Of course, it is needless to say that the approving person whose processing is omitted can refer to the data as the need arises. It is assumed that the setting content as to which approving person is passed over under what condition can be previously registered in, for example, the workflow management server 6.

In the workflow of the related art, in the case where plural approving persons are required, the visual confirmation and approval by all the approving persons are performed (see FIG. 5). However, when the system as in this embodiment is configured, for example, when there are three approving persons, according to the score added to the data, the settlement can be completed only by receiving the approval of one approving person who makes the final determination, the load of the approval work of the two remaining approving persons is reduced, and the business flow can be made efficient (see FIG. 6).

That is, the feature is that the correctness of the document is determined by the check in the input device image reading apparatus 101. Besides, as a variation of this method, the feature is that in the case where the approval of a certain specific approving person is obtained, the processing is performed on the assumption that the final approval is obtained. Since the data is directly added as the metadata to the electronic data, it is used for later retrieval and is useful. For example, it becomes possible to perform such abstract retrieval that only electronic data having data of 80 points or higher as the object of approval is extracted.

Second Embodiment

Next, a second embodiment of the invention will be described.

This embodiment is a modified example of the first embodiment, and its basic apparatus structure is the same as the first embodiment. This embodiment is different from the first embodiment in the content of a processing in a case where the reliability of document data is low in an approval processing in a workflow.

Figure 8:
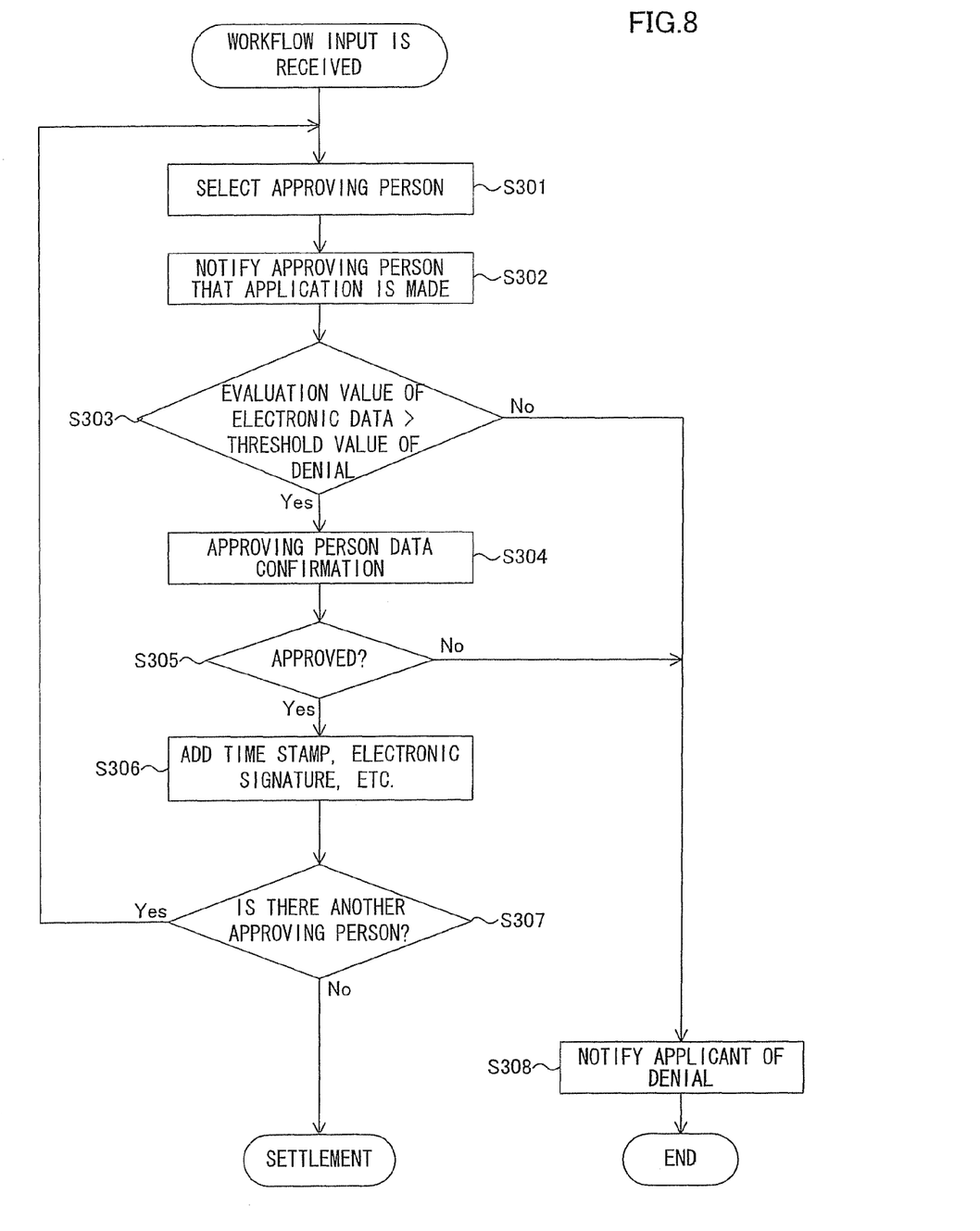
FIG. 8 is a flowchart for explaining a flow of a processing in a workflow management system according to a second embodiment of the invention.

FIG. 8 is a flowchart for explaining a flow of a processing in a workflow management system according to the second embodiment of the invention.

Since S301 to S302 and S304 to S308 in the flowchart shown in FIG. 8 are processings similar to S201 to S202 and S205 to S209 in FIG. 4, their description will be omitted.

The processing execution unit 106 forcibly stops (cancels the job of the workflow process) the workflow processing in the case where the reliability acquired by the reliability information acquisition unit 105 is a specified threshold value or lower (S303, No).

At the time of scan data output from the image reading apparatus 101, a level indicating whether an approval work is performed by each of approving persons (n persons) is set, and the check is automatically performed at each stage. In the case where a determination not to perform the processing is made, the processing is stopped, and notification is automatically made to an applicant as to where a problem exists in the applied document data.

As stated above, according to the embodiment, the document data with low reliability is not successively processed on the workflow, so that the efficiency of the business can be improved. By this, it is possible to reduce the load that the approving person carefully passes an eye over and checks all of an enormous amount of applied documents.

Third Embodiment

Next, a third embodiment of the invention will be described.

This embodiment is a modified example of the first embodiment, and its basic apparatus structure is the same as the first embodiment. This embodiment is different from the first embodiment in the content of a processing in a case where the reliability of document data is low in an approval processing in a workflow.

Figure 9:
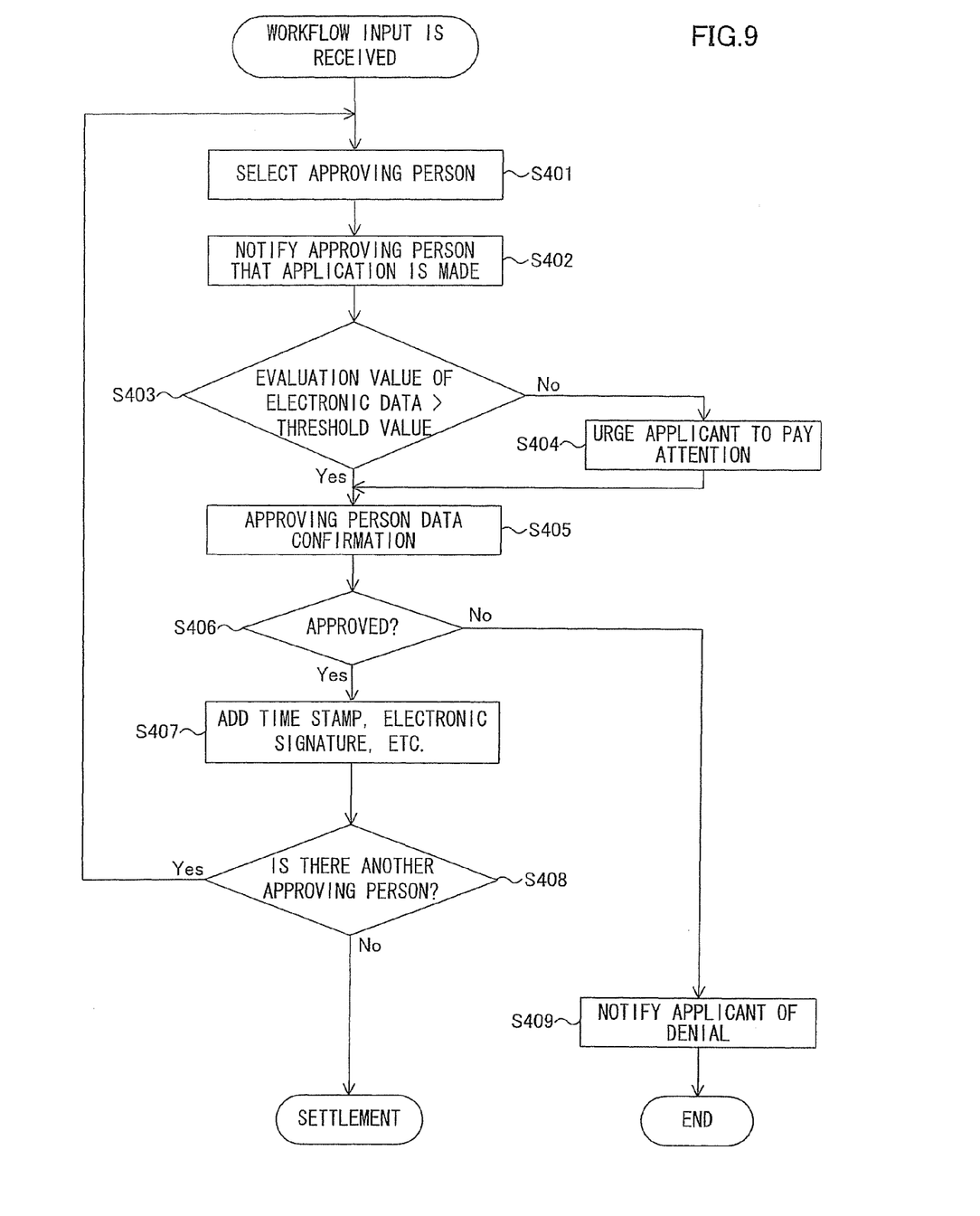
FIG. 9 is a flowchart for explaining a flow of a processing in a workflow management system according to a third embodiment of the invention.

FIG. 9 is a flowchart for explaining a flow of a processing in a workflow management system of the third embodiment. In this embodiment, an approving person is not passed over in the case where the reliability of document data is low, but an attention is given to the approving person according to the numerical value (evaluation score) of the reliability added to the document data.

Since S401 to S402 and S405 to S409 in the flowchart shown in FIG. 9 are processings similar to S201 to S202 and S205 to S209 in FIG. 4, their description will be omitted.

In this embodiment, a threshold value concerning the reliability of data is previously set, a comparison is made with the threshold value (S403), and in the case where the reliability (score) acquired in the reliability information acquisition unit 105 is lower than the specified threshold value (S403, No), the notification unit 107 sends attention (notification that the reliability of the document data in the image reading processing is low) to the PC of the approving person (S404), and causes the check to be performed in more detail than normal.

As a result of the check of the approving person, in the case where it is determined that the approval can not be made, that is notified to the user by the notification unit 107.

Fourth Embodiment

Next, a fourth embodiment of the invention will be described.

This embodiment is a modified example of the first embodiment, and its basic apparatus structure is the same as the first embodiment.

Figure 10:
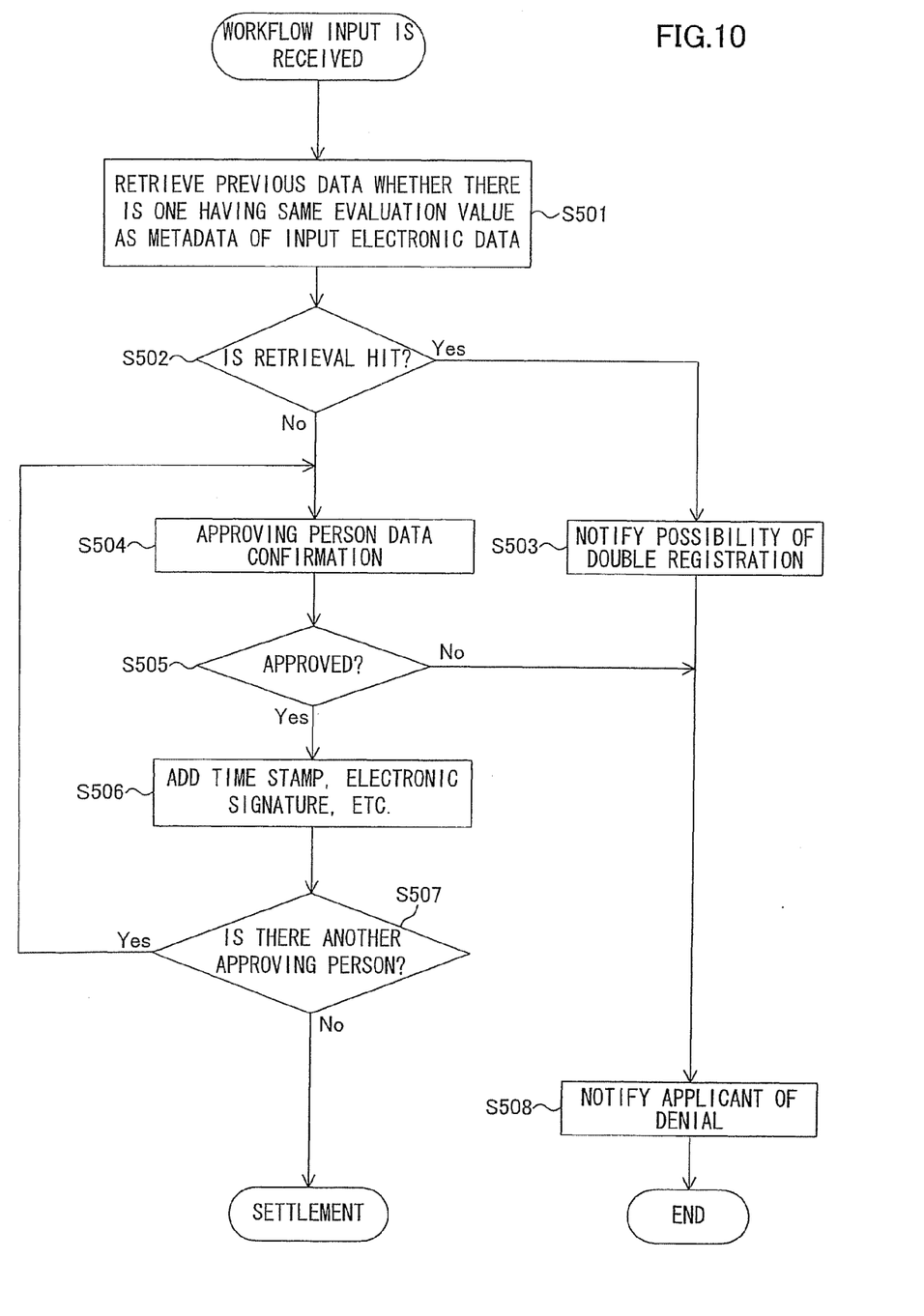
FIG. 10 is a flowchart for explaining a flow of a processing in a workflow management system according to a fourth embodiment of the invention.

FIG. 10 is a flowchart for explaining a flow of a processing in a workflow management system of the fourth embodiment. In this embodiment, in addition to the structure as in the first embodiment to the third embodiment, when document data is registered in a workflow, metadata of the inputted document data is compared with metadata of document data applied before that, and a duplicate application due to a miss or unfairness is made not be performed.

Since S504 to S508 in the flowchart shown in FIG. 10 are processings similar to S205 to S209 in FIG. 4, their description will be omitted.

In this embodiment, a remarkable point is specified with respect to the comparison of document data based on metadata, and when attention is paid to date item data of applied data, relatively new (about 1 to 2 months) data are made objects, and retrieval is automatically performed as to whether there has been a similar case, while comparison is performed (S501). In the case where the retrieval is hit (S502, Yes), it is determined that the application is duplicate, a notification is made that there is a possibility of the duplicate application (S503), and the subsequent workflow processing is not performed but is discarded. The notification unit 107 notifies the applicant of the denial and the reason (S508). Here, although the method of the retrieval is performed from the date, the retrieval may be started from the viewpoint of an applicant, sum or the like.

Besides, since there is a possibility that a similar sentence actually exists, it is preferable that not only the comparison of the metadata, but also image similarity retrieval is performed for what is hit by the comparison of the metadata, the result is also considered, and selection is made as to whether the processing is continued as the workflow or denial is made and the processing is discarded.

Figure 11:
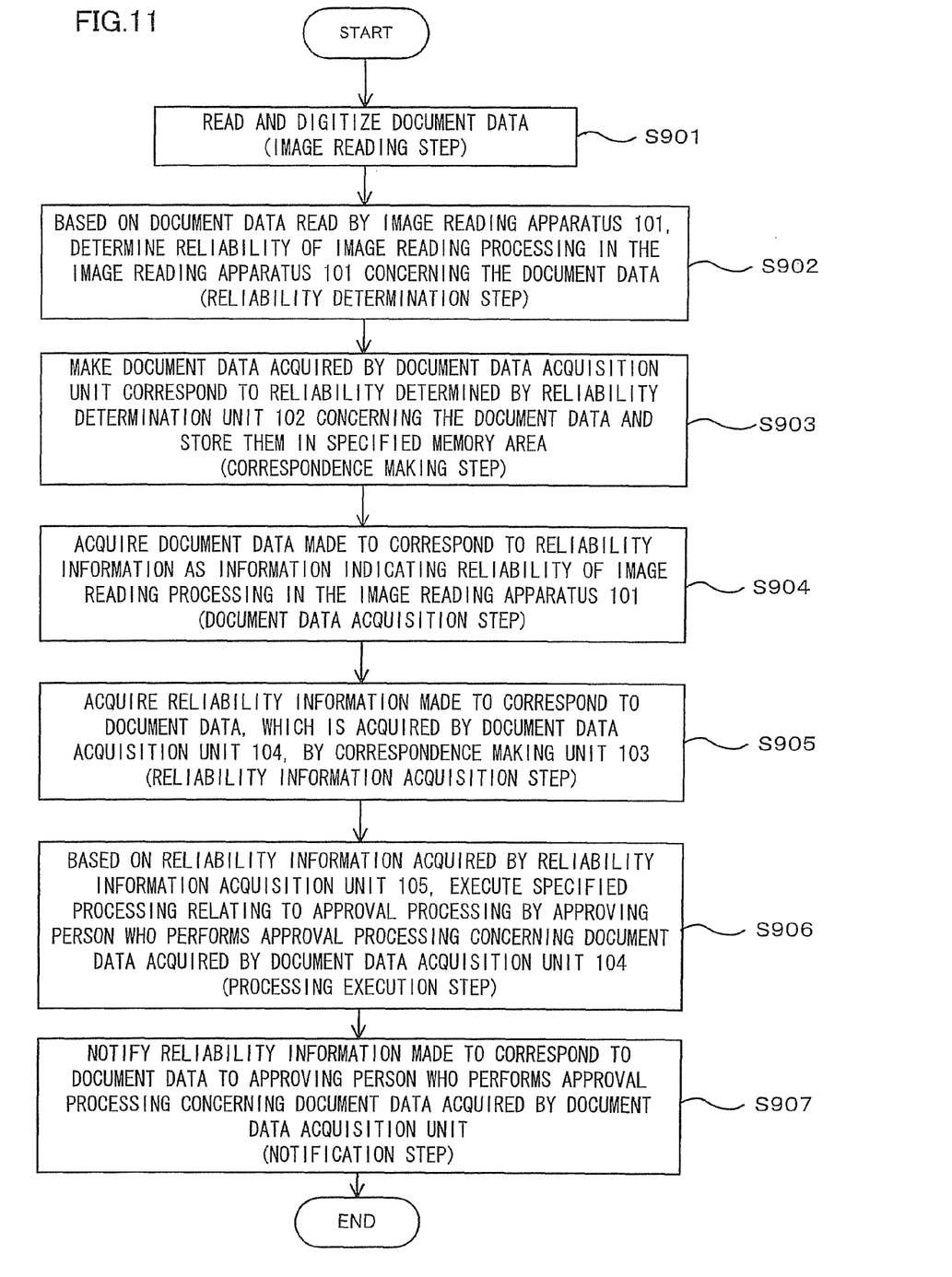
FIG. 11 is a flowchart for explaining a flow of a rough processing (workflow management method) in the workflow management system of the embodiment.

FIG. 11 is a flowchart for explaining a flow of a rough processing (a workflow management method) in the workflow management system according to this embodiment.

The image reading apparatus 101 reads document data and digitizes it (image reading step) (S901).

The reliability determination unit 102 determines the reliability of an image reading processing in the image reading apparatus 101 concerning the document data (reliability determination step) (S902) on the basis of the document data read by the image reading apparatus 101.

The correspondence making unit 103 makes the document data read by the image reading apparatus 101 correspond to the reliability determined by the reliability determination unit 102 concerning the document data, and stores them in a specified storage area (correspondence making step) (S903).

The document data acquisition unit 104 acquires document data made to correspond to the reliability information as the information indicating the reliability of the image reading processing in the image reading apparatus 101 from the specified storage area (document data acquisition step) (S904).

The reliability information acquisition unit 105 acquires the reliability information made to correspond to the document data, which is acquired by the document data acquisition unit 104, by the correspondence making unit 103 (reliability information acquisition step) (S905).

The processing execution unit 106 executes a specified processing relating to an approval processing (for example, an approval processing by an approving person who performs the approval processing) in the workflow concerning the document data acquired by the document data acquisition unit 104 on the basis of the reliability information acquired by the reliability information acquisition unit 105 (processing execution step) (S906). Specifically, at the processing execution step, the approval processing by the approving person made to correspond to the threshold value lower than the reliability acquired by the reliability information acquisition unit 105 is omitted. Besides, the threshold value made to correspond to the approving person is set to a high value for the approving person who performs the approval processing at a downstream side in the workflow. In addition, at the processing execution step, in the case where the reliability acquired by the reliability information acquisition unit 105 is a specified threshold value or lower, the workflow processing can be stopped.

The notification unit 107 notifies the reliability information made to correspond to the document data to the approving person who performs the approval processing in the workflow concerning the document data acquired by the document data acquisition unit (notification step) (S907). Besides, at the notification step, the approving person whose approval processing is omitted by the processing execution unit 106 is notified that the approval processing by the approving person is omitted. In addition to this, at the notification step, in the case where the reliability acquired by the reliability information acquisition unit 105 is a specified threshold value or lower, a notification may be made that the reliability in the image reading processing of the document data is low.

The respective steps in the processing of the workflow management system are realized by causing the CPU 801 to execute the workflow management program stored in the MEMORY 802.

As stated above, according to the foregoing respective embodiments, in the workflow system of the settlement processing, business processing or the like in which the input of a paper document is required, when the paper document is digitized, the reliability of the image reading processing at the time of digitization is determined and the determination result is represented by a numerical value (index indicating the degree of reliability of the created electronic data). The determination result of the reliability is embedded in the electronic data, the outputted electronic data is used as it is, and the electronic settlement is performed. The job of the workflow is automatically executed from the metadata such as the information indicating the format added to the electronic data, the evaluation score as the index of the reliability of the electronic data and the information of an input person. Besides, the evaluation score as the index of the reliability of the document data is compared with the individual threshold value, and based on the comparison result, the handling of the workflow job is simplified and the approving person or settlement person is urged to pay attention.

As described above, according to this embodiment, the input apparatus (equipment provided with the scan function, such as the image reading apparatus 101) is used in which at the stage of the digitization of the paper document, the numerical value indicating whether the state of the data captured for the specified format is reliable is created and is directly embedded in the electronic data, and data items necessary for the business processing are also embedded in the electronic data, so that it becomes possible to construct the workflow system centering around the electronic data.

Besides, since an existing metadata retrieval engine is used as it is and the retrieval of the document data can be performed, the load of the system configuration is also very low. When the document data is approved, the determination is not performed by only the visual inspection, but the reliability of the electronic data can be automatically determined to some degree, and therefore, the determination of the approving person is assisted, and the efficiency of the business can be raised.

In this embodiment, although the description has been made on the case where the function to carry out the invention is previously recorded in the inside of the apparatus, no limitation is made to this, and a similar function may be downloaded from a network to the apparatus, or a similar function recorded on a recording medium may be installed in the apparatus. As the recording medium, any form may be adopted as long as the recording medium, such as a CD-ROM, can store the program and can be read by the apparatus. Besides, the function obtained by the previous installation or download may realize the function by cooperation with an OS (Operating System) of the inside of the apparatus.

Although the invention has been described in detail on the specific mode, it would be apparent for one of ordinary skill in the art that various modifications and improvements can be made without departing from the sprit and scope of the invention.

As described above in detail, according to the invention, in the workflow management system in which the processing object is the document data read and digitized by the image reading apparatus and the workflow processing is managed, the technique to improve the processing efficiency in the workflow processing can be provided.

What is claimed is:

1. A workflow management system for managing a workflow processing in which a processing object is document data read and digitized by an image reading apparatus, comprising:
a document data acquisition unit configured to acquire, as the processing object in the workflow processing, the document data made to correspond to reliability information as information indicating reliability of an image reading processing in the image reading apparatus;
a reliability information acquisition unit configured to acquire the reliability information made to correspond to the document data acquired by the document data acquisition unit; and
a processing execution unit configured to execute, based on the reliability information acquired by the reliability information acquisition unit, a specified processing relating to an approval processing in the workflow concerning the document data acquired by the document data acquisition unit.

2. The workflow management system according to claim 1, further comprising a notification unit configured to notify the reliability information made to correspond to the document data to an approving person who performs the approval processing in the workflow concerning the document data acquired by the document data acquisition unit.

3. The workflow management system according to claim 1, wherein the processing execution unit omits an approval processing by an approving person made to correspond to a threshold value lower than the reliability acquired by the reliability information acquisition unit.

4. The workflow management system according to claim 3, wherein the threshold value made to correspond to the approving person is set to a higher value for the approving person who performs the approval processing at a more downstream side in the workflow.

5. The workflow management system according to claim 3, further comprising a notification unit configured to notify the approving person whose approval processing is omitted by the processing execution unit that the approval processing by the approving person is omitted.

6. The workflow management system according to claim 1, further comprising a notification unit configured to notify that the reliability in the image reading processing of the document data is low in a case where the reliability acquired by the reliability information acquisition unit is a specified threshold value or lower.

7. The workflow management system according to claim 1, wherein the processing execution unit stops the workflow processing in a case where the reliability acquired by the reliability information acquisition unit is a specified threshold value or lower.

8. The workflow management system according to claim 1, further comprising:
an image reading apparatus to read and digitize the document data;
a reliability determination unit configured to determine the reliability of the image reading processing in the image reading apparatus concerning the document data based on the document data read by the image reading apparatus; and
a correspondence making unit configured to make the document data read by the image reading apparatus correspond to the reliability determined by the reliability determination unit concerning the document data and to store them into a specified storage area.

9. The workflow management system according to claim 8, wherein the correspondence making unit adds, as metadata, the reliability determined by the reliability determination unit concerning the document data to the document data acquired by the document data acquisition unit.

10. A workflow management system for managing a workflow processing in which a processing object is document data read and digitized by an image reading apparatus, comprising:
document data acquisition means for acquiring, as the processing object in the workflow processing, the document data made to correspond to reliability information as information indicating reliability of an image reading processing in the image reading apparatus;
reliability information acquisition means for acquiring the reliability information made to correspond to the document data acquired by the document data acquisition means; and
processing execution means for executing, based on the reliability information acquired by the reliability information acquisition means, a specified processing relating to an approval processing in the workflow concerning the document data acquired by the document data acquisition means.

11. The workflow management system according to claim 10, further comprising notification means for notifying the reliability information made to correspond to the document data to an approving person who performs the approval processing in the workflow concerning the document data acquired by the document data acquisition means.

12. The workflow management system according to claim 10, wherein the processing execution means omits an approval processing by an approving person made to correspond to a threshold value lower than the reliability acquired by the reliability information acquisition means.

13. The workflow management system according to claim 12, wherein the threshold value made to correspond to the approving person is set to a higher value for the approving person who performs the approval processing at a more downstream side in the workflow.

14. The workflow management system according to claim 12, further comprising notification means for notifying the approving person whose approval processing is omitted by the processing execution means that the approval processing by the approving person is omitted.

15. The workflow management system according to claim 10, further comprising notification means for notifying that the reliability in the image reading processing of the document data is low in a case where the reliability acquired by the reliability information acquisition means is a specified threshold value or lower.

16. The workflow management system according to claim 10, wherein the processing execution means stops the workflow processing in a case where the reliability acquired by the reliability information acquisition means is a specified threshold value or lower.

17. The workflow management system according to claim 10, further comprising:

an image reading apparatus to read and to digitize the document data;

reliability determination means for determining the reliability of the image reading processing in the image reading apparatus concerning the document data based on the document data read by the image reading apparatus; and correspondence making means for making the document data read by the image reading apparatus correspond to the reliability determined by the reliability determination means concerning the document data and for storing them into a specified storage area.

18. The workflow management system according to claim 17, wherein the correspondence making means adds, as metadata, the reliability determined by the reliability determination means concerning the document data to the document data acquired by the document data acquisition means.

19. A workflow management method for managing a workflow processing in which a processing object is document data read and digitized by an image reading apparatus, comprising the steps of:

acquiring, as the processing object in the workflow processing, the document data made to correspond to reliability information as information indicating reliability of an image reading processing in the image reading apparatus;

acquiring the reliability information made to correspond to the document data acquired at the step of acquiring the document data; and executing, based on the reliability information acquired at the step of acquiring the reliability information, a specified processing relating to an approval processing in the workflow concerning the document data acquired at the step of acquiring the document data.

20. The workflow management method according to claim 19, wherein at the step of executing the processing, an approval processing by an approving person made to correspond to a threshold value lower than the reliability acquired at the step of acquiring the reliability information is omitted.

* * * * *